(12) United States Patent
Zhang et al.

(10) Patent No.: US 11,270,739 B1
(45) Date of Patent: Mar. 8, 2022

(54) ELECTRONIC DEVICE THAT INCLUDES ONE OR MORE REACTANTS THAT GENERATE A GASEOUS OXIDIZING AGENT COMPONENT INSIDE THE ELECTRONIC DEVICE, AND RELATED SUBASSEMBLIES AND METHODS

(71) Applicant: Seagate Technology LLC, Fremont, CA (US)

(72) Inventors: Lihong Zhang, Singapore (SG); Xiong Liu, Singapore (SG)

(73) Assignee: Seagate Technology LLC, Fremont, CA (US)

(*) Notice: Subject to any disclaimer, the term of this patent is extended or adjusted under 35 U.S.C. 154(b) by 0 days.

(21) Appl. No.: 17/171,047

(22) Filed: Feb. 9, 2021

(51) Int. Cl.
*G11B 33/02* (2006.01)
*G11B 33/14* (2006.01)

(52) U.S. Cl.
CPC ........ *G11B 33/022* (2013.01); *G11B 33/1453* (2013.01)

(58) Field of Classification Search
None
See application file for complete search history.

(56) References Cited

U.S. PATENT DOCUMENTS

| | | |
|---|---|---|
| 3,140,149 A | 7/1964 | Habernickel |
| 3,650,705 A | 3/1972 | Majewski |
| 4,005,182 A | 1/1977 | Ito et al. |
| 4,292,055 A | 9/1981 | De Castella et al. |
| 4,323,465 A | 4/1982 | Downey et al. |
| 4,831,475 A | 5/1989 | Kakuda et al. |
| 4,967,295 A | 10/1990 | Yamauchi et al. |
| 5,012,360 A | 4/1991 | Yamauchi et al. |
| 5,059,291 A | 10/1991 | Yamauchi et al. |
| 5,075,807 A | 12/1991 | Inoue et al. |
| 5,096,549 A | 3/1992 | Yamauchi et al. |
| 5,118,261 A | 6/1992 | Yamauchi et al. |
| 5,293,286 A | 3/1994 | Hasegawa et al. |
| 5,302,270 A | 4/1994 | Yamauchi et al. |

(Continued)

FOREIGN PATENT DOCUMENTS

| | | |
|---|---|---|
| CN | 1524266 A | 8/2004 |
| CN | 1578987 A | 2/2005 |

(Continued)

OTHER PUBLICATIONS

Unpublished United States Utility U.S. Appl. No. 16/944,573, filed Jul. 31, 2020 (No Copy Enclosed).

(Continued)

*Primary Examiner* — William J Klimowicz
(74) *Attorney, Agent, or Firm* — Kagan Binder, PLLC

(57) ABSTRACT

The present disclosure relates to electronic devices that include one or more solid reactants that react with one or more of water vapor and carbon dioxide gas to form a gaseous oxidizing agent component within the electronic device. In some embodiments, the electronic devices include a solid carrier that includes the one or more reactants. The present disclosure also relates to electronic devices that include a container that includes the one or more reactants in a manner that the gaseous oxidizing component can transfer from the container to the interior gas space of the electronic device. The present disclosure also involves related methods.

21 Claims, 4 Drawing Sheets

(56) References Cited

U.S. PATENT DOCUMENTS

| | | | |
|---|---|---|---|
| 5,392,177 A | 2/1995 | Chainer et al. | |
| 5,417,743 A * | 5/1995 | Dauber | B01D 46/10 |
| | | | 360/99.15 |
| 5,454,157 A | 10/1995 | Ananth et al. | |
| 6,110,533 A | 8/2000 | Cote et al. | |
| 6,317,286 B1 | 11/2001 | Murphy et al. | |
| 6,587,307 B1 | 7/2003 | Raymond et al. | |
| 7,062,387 B1 | 6/2006 | Burns et al. | |
| 7,460,333 B2 | 12/2008 | Akamatsu et al. | |
| 7,478,760 B2 | 1/2009 | Beally et al. | |
| 7,538,972 B2 * | 5/2009 | Burts-Cooper | G11B 33/121 |
| | | | 141/4 |
| 7,695,547 B2 | 4/2010 | Smith | |
| 8,094,409 B2 | 1/2012 | Feliss et al. | |
| 8,199,425 B1 | 6/2012 | Gustafson et al. | |
| 8,254,055 B2 | 8/2012 | Brown | |
| 8,451,559 B1 | 5/2013 | Berding et al. | |
| 8,885,287 B1 | 11/2014 | Koike et al. | |
| 9,058,851 B1 | 6/2015 | Hanke | |
| 9,725,530 B2 | 8/2017 | Cheng et al. | |
| 10,115,436 B1 * | 10/2018 | Zhang | G11B 33/146 |
| 10,468,071 B1 | 11/2019 | Tasaka et al. | |
| 10,566,031 B2 | 2/2020 | Brand | |
| 10,593,372 B2 | 3/2020 | Yap et al. | |
| 10,957,363 B1 * | 3/2021 | Brand | G11B 33/1453 |
| 2003/0179489 A1 * | 9/2003 | Bernett | G11B 33/1466 |
| | | | 360/97.22 |
| 2005/0047001 A1 * | 3/2005 | Logan | G11B 33/1446 |
| | | | 360/97.18 |
| 2005/0241483 A1 * | 11/2005 | Okada | B01J 20/28033 |
| | | | 96/134 |
| 2006/0066974 A1 | 3/2006 | Akamatsu et al. | |
| 2006/0171065 A1 | 8/2006 | Akamatsu et al. | |
| 2006/0272507 A1 * | 12/2006 | Johnson | G11B 33/146 |
| | | | 96/134 |
| 2009/0296271 A1 | 12/2009 | Feliss et al. | |
| 2011/0149435 A1 | 6/2011 | Brown | |
| 2012/0031431 A1 | 2/2012 | Carlson et al. | |
| 2014/0377143 A1 * | 12/2014 | Ellison | G11B 25/043 |
| | | | 422/222 |
| 2015/0096884 A1 | 4/2015 | Shealy et al. | |
| 2016/0104515 A1 | 4/2016 | Strange | |
| 2016/0336045 A1 | 11/2016 | Beatty et al. | |
| 2019/0365939 A1 | 12/2019 | McGinnis et al. | |
| 2021/0043232 A1 * | 2/2021 | Luebben | G11B 33/1466 |
| 2021/0043233 A1 * | 2/2021 | Luebben | G11B 33/022 |
| 2021/0287719 A1 | 9/2021 | Luebben et al. | |

FOREIGN PATENT DOCUMENTS

| | | |
|---|---|---|
| CN | 101447191 A | 6/2009 |
| CN | 102194465 A | 9/2011 |
| CN | 102403016 A | 4/2012 |
| CN | 103187074 A | 7/2013 |

OTHER PUBLICATIONS

Unpublished United States Utility U.S. Appl. No. 16/944,516, filed Jul. 31, 2020 (No Copy Enclosed).

Zhengqiang et al., "Analysis of the Mechanical Properties of Head /Disk Interface in Air-Helium Gas Mixtures," Journal of South China University of Technology, vol. 47, No. 3, pp. 44-52, Mar. 2019, (9 pages).

First Chinese Office Action, and English Translation thereof, for Chinese Application No. 202010789195 8, dated Jun. 28, 2021, (15 pages).

Medvedev et al., "Stabilization of Zinc Peroxide in the Combined Process of Granulation and Encapsulation," Theoretical Foundations of Chemical Engineering, vol. 52, No. 4, 2018, (6 pages).

Shames et al., "Unusual Stabilization of Zinc Peroxide by Manganese Oxide: Mechanistic Understanding by Temperature-Dependent EPR Studies," The Journal of Physical Chemistry, vol. 123, Issue 34, pp. 20884-20892. Jul. 18, 2019, (9 pages).

* cited by examiner

ELECTRONIC DEVICE THAT INCLUDES ONE OR MORE REACTANTS THAT GENERATE A GASEOUS OXIDIZING AGENT COMPONENT INSIDE THE ELECTRONIC DEVICE, AND RELATED SUBASSEMBLIES AND METHODS

CROSS-REFERENCE TO RELATED APPLICATIONS

The present nonprovisional application is related to each of U.S. Ser. No. 16/944,516 filed on Jul. 31, 2020, and U.S. Ser. No. 16/944,573, filed on Jul. 31, 2020, wherein the entirety of each nonprovisional application is incorporated herein by reference.

BACKGROUND

The present disclosure relates to electronic devices such as data storage devices like hard disk drives (HDDs) (internal and/or external), network attached storage (NAS), and the like. There is a continuing need to solve problems related to maintaining internal, electronic drive components in as-built conditions for the service life of the electronic device.

SUMMARY

The present disclosure includes embodiments of an electronic device including:
  a) a housing having an interior gas space;
  b) one or more electronic components disposed within the housing;
  c) one or more solid reactants that react with one or more of water vapor and carbon dioxide gas to form a gaseous oxidizing agent component; and
  d) a solid carrier including the one or more solid reactants.
The present disclosure includes embodiments of an electronic device including:
  a) a housing having an interior gas space;
  b) one or more electronic components disposed within the housing;
  c) one or more solid reactants that react with at least water vapor and carbon dioxide gas to form a gaseous oxidizing agent component.
The present disclosure includes embodiments of a method of making an electronic device, the method including:
  a) assembling an electronic device including:
    i) a housing including:
      A) a base;
      B) a process cover attached to the base; and
      C) an interior gas space; and
    ii) one or more electronic components disposed within the housing; and
  b) inserting a container through an aperture in the housing and into the interior gas space of the housing, wherein the container includes a membrane that is permeable to gaseous oxidizing agent component to allow gaseous oxidizing agent component to transfer from inside the container to the interior gas space, and wherein the container contains one or more solid reactants that react with one or more of water vapor or carbon dioxide gas to form the gaseous oxidizing agent component; and
  c) hermetically sealing the aperture.
The present disclosure includes embodiments of a method of generating a gaseous oxidizing agent component in a hermetically sealed electronic device, wherein the method includes:
  a) providing an electronic device including:
    i) a housing having an interior gas space;
    ii) one or more electronic components disposed within the housing;
    iii) one or more solid reactants that react with one or more of water vapor or carbon dioxide gas to form a gaseous oxidizing agent component; and
    iv) a solid carrier comprising the one or more solid reactants;
  b) operating the hermetically sealed electronic device to perform read/write operations, wherein water vapor and/or carbon dioxide gas are passively generated and can react with the one or more solid reactants to form the gaseous oxidizing agent component.

DETAILED DESCRIPTION

Figure 1:
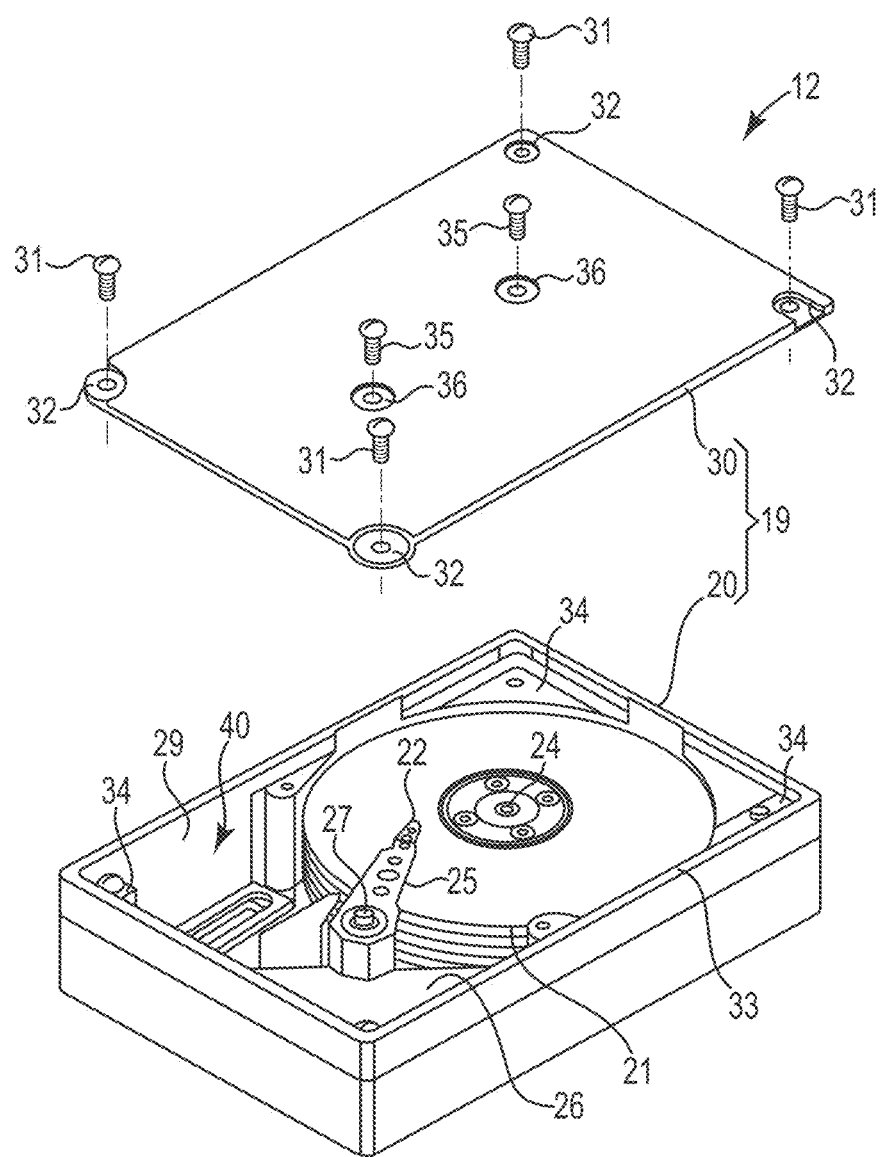
FIG. 1 is an exploded perspective view of a hard disk drive.

The present disclosure relates to electronic devices that include one or more solid reactants that react with one or more of water vapor and carbon dioxide gas to form a gaseous oxidizing agent component within the electronic device.

A wide variety of electronic devices having an interior space and one or more electronic components disposed within the interior space can benefit by having one or more solid reactants that generate a gaseous oxidizing agent component after the electronic device is assembled and during at least a portion of it service life as described herein. In some embodiments, an electronic device is a data storage device. Non-limiting examples of data storage devices include hard disk drives (internal and/or external), network attached storage (NAS), and the like. Examples of hard disc drives are reported in U.S. Pat. No. 7,478,760 (Beatty et al.) and U.S. Pat. No. 7,695,547 (Smith), wherein the entireties of said patents are incorporated herein by reference.

The interior gas space of an electronic device can include helium gas to maintain sufficient vibration mitigation. As the fraction of helium is decreased (e.g., from 100%), the vibrational performance of the drive mechanics can degrade, suggesting it can be beneficial to limit the non-helium oxidizing gas constituents to a minimum mole fraction as desired. The helium gas is present in the interior gas space at a mole fraction of at least 80 percent, at least 97 percent, or even at least 99 percent based on the total gas in the interior gas space (e.g., from 80 to 99 percent, from 80 to 95 percent, from 85 to 95 percent, or even from 85-90 percent).

The interior gas space of an electronic device can have a nominal relative humidity of 20% or less at 25° C., 15% or less at 25° C., 10% or less at 25° C., 5% or less at 25° C., or even 1% or less at 25° C.

In some embodiments, an electronic device can be a hermetically sealed electronic device, which can be defined by, e.g., the amount of gas that leaks from the electronic device after it has been sealed (e.g., a welded HDD). In some embodiments, the interior gas space includes helium gas and the hermetically sealed electronic device has a helium leak rate of $50 \times 10^{-8}$ atm (atmosphere) cc (cubic centimeter)/second or less at 25° C.; $20 \times 10^{-8}$ atm cc/second or less, $10 \times 10^{-8}$ atm cc/second or less; $5 \times 10^{-8}$ atm cc/second or less at 25° C.; or even $4.2 \times 10^{-8}$ atm cc/second or less at 25° C.

For desirable performance and reliability characteristics in disk drives an operating atmosphere can include an initial fill of a gas mixture that includes primarily helium gas and a second minor gas fraction consisting of a gaseous oxidizing agent component (oxidizer) for the entire operational life of the drive. The purpose of the primarily helium environment is to reduce gas turbulence induced vibration of the drives internal components to facilitate track follow capability across disk track widths of 100 nm or less. The second minor gas component, the gaseous oxidizing agent component can oxidize inorganic and/or organic materials and limit their accumulation on one or more components within the interior of an electronic device such as a hard disk drive as desired (e.g., to maintain one or more electronic components within the interior space in as-built conditions). Chemical reactions between the gaseous oxidizing agent component and inorganic and/or organic materials is believed to result in the formation of gaseous by-products that are free to transport away from the component.

It has been observed that the concentration of oxygen contained in welded HDDs can unfortunately decrease over time. The rate of decrease of oxygen concentration can depend on a variety of factors such as one or more drive operating conditions. The loss of oxygen over time can be attributed to chemical reactions between oxygen and internal drive components. Such internal drive components include, but are not limited to, the recording media, activated carbon, and ferrous metal components. One non-limiting example of such an internal drive component is a heat-assisted magnetic recording near field transducer ("HAMR NFT"). The measured rate of loss of oxygen is expected to result in the oxygen concentration dropping below a desired concentration over the service life of the HDD.

An example of a reaction between oxygen and carbon-containing materials on internal drive components can generate carbon dioxide gas and water vapor and can be represented by the following generic chemical equation:

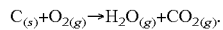

$$C_{(s)} + O_{2(g)} \rightarrow H_2O_{(g)} + CO_{2(g)}.$$

Over time while operating the electronic device (HDD), the beneficial reaction between oxygen and carbon-containing materials on internal drive components can continuously produce water vapor and carbon dioxide gas. Unfortunately, with the increase of the concentration of carbon dioxide gas inside the HDD, the density of the gases keeps on increasing, which can degrade the HDD recording to an undue degree.

The present inventors have discovered that selecting one or more reactants to both react with one or more of water vapor and carbon dioxide gas (and thereby consume carbon dioxide gas and/or water vapor) while at the same time forming a gaseous oxidizing agent component can advantageously provide a self-sustaining approach to providing the beneficial reaction between oxygen and carbon-containing materials on internal drive components. Such a self-sustaining approach can maintain the concentration of a gaseous oxidizing agent component in the interior gas space of an electronic device within a desirable range over a variety of operating conditions and for a given time period (e.g., throughout the life of the drive). Maintaining a gaseous oxidizing agent component has the advantage of maintaining the helium mole fraction at a desired level to help provide a favorable mechanical vibration environment, while at the same time maintaining a desired supply of a gaseous oxidizing agent component to reduce or prevent performance impairment of one or more internal, electronic drive components due to insufficient oxidizer supply.

According to one aspect, the present disclosure includes a passive approach for generating a gaseous oxidizing agent component from one or more reactants at a rate selected to consume carbon dioxide gas and/or water vapor while maintaining a desired concentration of the gaseous oxidizing agent component as described herein. As used herein, "a gaseous oxidizing agent component" includes one or more oxidizing agent species. Non-limiting examples of oxidizing agent species include atomic oxygen, molecular oxygen, ozone, nitrous oxide, hydrogen peroxide, oxygen radical, dioxygen radicals, and mixtures thereof.

A type and amount of a solid reactant (or mixture thereof) that reacts with carbon dioxide gas and/or water vapor to generate a gaseous oxidizing agent component can be selected based on one or more factors such as the target mole fraction of gaseous oxidizing agent component in the interior space of an electronic device; the operating temperature of an electronic device, which the one or more solid reactants will be exposed to; the service life of the electronic device; and the like. In some embodiments, the composition can be included in an electronic device that has been initially filled with a gas mixture of helium/oxidizing gas species when initially assembled.

In some embodiments, one or more solid reactants that react with carbon dioxide gas and/or water vapor to generate a gaseous oxidizing agent component are selected so that the gaseous oxidizing agent component is maintained in the interior gas space at a mole fraction in the range from 0.1 to less than 20 mole percent based on the total gas in the interior gas space; a mole fraction in the range from 0.1 to 15 mole percent based on the total gas in the interior gas space; a mole fraction in the range from 0.1 to 10 mole percent based on the total gas in the interior gas space; a mole fraction in the range from 0.1 to 5 mole percent based on the total gas in the interior gas space; a mole fraction in the range from 0.5 to 5 mole percent based on the total gas in the interior gas space; a mole fraction in the range from 0.5 to 4 mole percent based on the total gas in the interior gas space; or even a mole fraction in the range from 1.5 to 3 mole percent based on the total gas in the interior gas space.

In some embodiments, one or more solid reactants that react with carbon dioxide gas and/or water vapor to generate a gaseous oxidizing agent component are selected so that the gaseous oxidizing agent component is maintained in the interior gas space at a desired mole fraction for a desired time period after the electronic device (e.g., hard disk drive) has been finally assembled and ready for service (e.g., at least a portion of the service life of the hard disk drive). In some embodiments, one or more solid reactants that react with carbon dioxide gas and/or water vapor to generate a gaseous oxidizing agent component are selected so that the gaseous oxidizing agent component is maintained in the interior gas space at a desired mole fraction for a time period of at least two months, or even at least six months. In some embodiments, one or more solid reactants that react with carbon dioxide gas and/or water vapor to generate a gaseous oxidizing agent component are selected so that the gaseous oxidizing agent component is maintained in the interior gas space at a desired mole fraction for a time period of up to 3 years, up to 4 years, up to 5 years, up to 6 years, up to 7 years, up to 8 years, or even up to 9 years.

One or more solid reactants that react with carbon dioxide gas and/or water vapor to generate a gaseous oxidizing agent component are selected to passively generate a gaseous oxidizing agent component at a desired rate at one or more operating temperatures. In some embodiments, one or more solid reactants that react with carbon dioxide gas and/or water vapor to generate a gaseous oxidizing agent component are selected to generate a gaseous oxidizing agent component at a desired rate at an operating temperature in the range from 5° C. to 75° C., from 5° C. to 65° C., or even from 30° C. to 60° C. For embodiments where the one or more solid reactants generate a gaseous oxidizing agent component passively, the one or more solid reactants can be selected so that it generates a gaseous oxidizing agent component at a sufficiently slow rate so that the composition can last for a desired portion of the service life of the electronic device, as described above.

Passive production of a gaseous oxidizing agent component refers to reaction of one or more solid reactants with water vapor and/or carbon dioxide gas through their inherent physical and chemical properties as the one or more solid reactants contact with carbon dioxide gas and/or water vapor that is present and/or generated inside the electronic device resulting in the production of a gaseous oxidizing agent component a rate sufficient to maintain the desired concentration of a gaseous oxidizing agent component in an electronic device such as a hard disk drive. Passive generation of gaseous oxidizing agent component is in contrast to active generation of gaseous oxidizing agent component, which refers to the controlled application of active mechanisms such as one or more of heat, light, electrochemical, injected electrons and/or water to oxygen liberating compounds to control the rate at which oxygen is produced.

Non limiting examples of one or more solid reactants that react with carbon dioxide gas and/or water vapor to generate a gaseous oxidizing agent component are illustrated below.

One or more solid reactants that react with carbon dioxide gas and/or water vapor to generate a gaseous oxidizing agent component In some embodiments, as illustrated by the equations 1~4 below, the one or more solid reactants "F" and the water vapor or carbon dioxide gas "G" react with each other to generate the oxidizing agent species "C" inside the electronic device (e.g., hard disk drive).

$F+G \rightarrow B+C$        equation 1

$F+G \rightarrow B+C+D$        equation 2

$F+G+E \rightarrow B+C$        equation 3

$F+G+E \rightarrow B+C+D$        equation 4

In some embodiments, "B" is a byproduct of the reaction, "D" is a secondary product of reaction, and "E" is either a catalyst a stabilizer or a barrier.

In some embodiments, the one or more solid reactants are chosen from peroxides, superoxides, percarbonates, perborates, permanganates, persulfates, peroxyhydrate salts, and mixtures thereof. In some embodiments, the one or more reactants are chosen from calcium peroxide, magnesium peroxide, barium peroxide, zinc peroxide, cadmium peroxide, strontium peroxide, lithium peroxide, sodium peroxide, potassium peroxide, lithium nickel peroxide, potassium superoxide, sodium superoxide, sodium percarbonate, potassium percarbonate, calcium percarbonate, magnesium percarbonate, sodium perborate, sodium perborate tetrahydrate, potassium perborate, calcium perborate, magnesium perborate, potassium permanganate, sodium persulfate, potassium persulfate, potassium pyrophosphate peroxyhydrate, sodium sulfate-hydrogen peroxide-sodium chloride adduct, sodium chlorate and mixtures thereof. In some embodiments, the one or more reactants are chosen from potassium superoxide, sodium superoxide, and mixtures thereof.

Non-limiting examples of chemical reactions involving solid reactants that react with carbon dioxide gas and/or water vapor to generate a gaseous oxidizing agent component are illustrated by the following chemical equations:

$$2KO_2 + 2H_2O \rightarrow 2KOH + H_2O_2 + O_2$$

$$4KO_2 + 2CO_2 \rightarrow 2K_2CO_3 + 3O_2.$$

Water vapor can be present inside an electronic device due to one or more sources. As mentioned above, water vapor can be generated due to the reaction between oxygen and carbon-containing materials on internal drive components.

Also, the present inventors have observed that sealed hard disk drives tend to generate a certain level of relative humidity due to the "built-in" moisture while assembling the hard disk drive and/or one or more internal hard disk drive components releasing moisture over time. One example showed that relative humidity inside a sealed hard disk drive continued to increase over a period of three weeks, which suggest that water vapor release occurs for a relatively long period of time after assembly. Accordingly, in some embodiments, this is another source of water vapor that can react with one or more solid reactants described herein.

In some embodiments, the reaction between a solid reactant and carbon dioxide gas or water vapor to generate a gaseous oxidizing agent component can also produce one or more byproducts that decompose and/or react to form water vapor as a source of water vapor to react with one or more solid reactants described herein. In some embodiments, the byproducts can decompose and/or react to form a gaseous oxidizing agent such as oxygen (instead of or in addition to forming water vapor), which can be used for the beneficial reaction between gaseous oxidizing agent component (e.g., oxygen) and carbon-containing materials on internal drive components as described herein.

Nonlimiting examples of byproducts that decompose or react to form water vapor are illustrated by the following chemical equations:

$$H_2O_2 \rightarrow H_2O + 1/2O_2$$

$$3KOH + 2CO_2 \rightarrow K_2CO_3 + KHCO_3 + H_2O$$

$$2KHCO_3 \rightarrow K_2CO_3 + H_2O + CO_2.$$

The one or more of these sources of water vapor can react with one or more solid reactants to form a gaseous oxidizing agent component in a manner that permits the self-sustaining approach described herein for providing the beneficial reaction between gaseous oxidizing agent component (e.g., oxygen) and carbon-containing materials on internal drive components.

Carbon dioxide gas can be present inside an electronic device due to one or more sources. As mentioned above, carbon dioxide gas can be generated due to the reaction between oxygen and carbon-containing materials on internal drive components.

In some embodiments, the reaction between a solid reactant and carbon dioxide gas or water vapor to generate a gaseous oxidizing agent component can also byproducts that decompose or react to form carbon dioxide gas. A nonlimiting example of a byproduct that decomposes to form carbon dioxide gas is illustrated by the following chemical equation:

$$2KHCO_3 \rightarrow K_2CO_3 + H_2O + CO_2.$$

The one or more of these sources of carbon dioxide gas can react with one or more solid reactants to form a gaseous oxidizing agent component in a manner that permits the self-sustaining approach described herein for providing the beneficial reaction between gaseous oxidizing agent component (e.g., oxygen) and carbon-containing materials on internal drive components.

As mentioned, one or more solid reactants can be selected to both react with one or more of water vapor and carbon dioxide gas (and thereby consume carbon dioxide gas and/or water vapor) while at the same time forming a gaseous oxidizing agent component can advantageously provide a self-sustaining approach to providing the beneficial reaction between oxygen and carbon-containing materials on internal drive components. The examples of sources of water vapor and carbon dioxide gas described herein can help make the generation of gaseous oxidizing agent component (e.g., oxygen) a self-sustaining process.

In some embodiments, the reaction between a solid reactant and carbon dioxide gas or water vapor to generate a gaseous oxidizing agent component can also byproducts that have additional useful functionality. For example, one or more solid reactants can react with one or more of water vapor and carbon dioxide gas to also form one or more byproducts that are alkaline hygroscopic compounds or that react or decompose to form alkaline hygroscopic compounds. Nonlimiting examples of such reactions are illustrated by the following chemical equations:

$$2KO_2 + 2H_2O \rightarrow 2KOH + H_2O_2 + O_2$$

$$4KO_2 + 2CO_2 \rightarrow 2K_2CO_3 + 3O_2$$

$$3KOH + 2CO_2 \rightarrow K_2CO_3 + KHCO_3 + H_2O$$

$$2KHCO_3 \rightarrow K_2CO_3 + H_2O + CO_2.$$

Each of $KOH$, $K_2CO_3$ and $KHCO_3$ are alkaline hygroscopic compounds which may absorb acidic corrosive gases and reduce contamination levels inside an electronic device (e.g., a hard disk drive that has a HAMR NFT).

In some embodiments, the one or more solid reactants that can generate a gaseous oxidizing agent component can be in a variety of forms such as pellet or other preparation can be placed inside the drive during production.

In some embodiments, the rate of reaction between one or more solid reactants and water vapor or carbon dioxide gas may be accelerated chemically. Non-limiting examples of catalysts include one or more of potassium iodide, manganese oxides, manganese compounds, copper oxides, silver, potassium dichromate, vanadium oxides, vanadium compounds, iron oxides, and mixtures thereof.

In some embodiments, a solid carrier can include the one or more solid reactants. A solid carrier can help improve reaction efficiency so carbon dioxide gas and/or water vapor are consumed in the reaction with the one or more solid reactants at a desirable rate. In some embodiments, a solid carrier can have an exterior surface and a plurality of pores that form interior surfaces, where the one or more solid reactants are present on the exterior and interior surfaces of the solid carrier. Pore number and size can be used to adjust the surface area that has solid reactant that can react with water vapor and/or carbon dioxide, thereby adjust the rate of consumption of carbon dioxide gas and/or water vapor. In some embodiments, the plurality of pores have a pore diameter in the range from 0.1 to 50 nanometers, or even from 0.5 to 30 nanometers. For example, in some embodiments, a silica gel solid carrier may have a larger pore diameter than a molecular sieve solid carrier (e.g., 5-35 nm versus 0.5-1.2 nm, respectively).

The solid carrier can be made out of a variety of materials. In some embodiments, the solid carrier can function, as mentioned above, as a support for the one or more solid reactants to increase the surface area that the one or more solid reactants have to contact water vapor and/or carbon dioxide gas. In some embodiments, the solid carrier is an inorganic, solid carrier. In some embodiments, the solid carrier can be made of desiccant material. As used herein, a "desiccant" refers to a material that can absorb or desorb water at the same rates at equilibrium for a given temperature.

Non-limiting examples of desiccant, solid carriers include silica gel, molecular sieves, and combinations thereof. In some embodiments, a desiccant, solid carrier can include silica gel, activated alumina, alumina, calcium oxide, activated carbon, sodium percarbonate, calcium sulfate, magnesium aluminum silicate, and combinations thereof.

A solid carrier that includes one more solid reactants to facilitate a chemical reaction according to the present disclosure can be made by a variety of methods. One non-limiting example includes contacting solid carrier with one or more solutions that include one or more desired reactants followed by drying (e.g., heating) to remove volatile solvent. An example of supporting material on a porous inorganic carrier is described in U.S. Pat. No. 9,725,530 (Cheng et al.), wherein the entirety of said patent is incorporated herein by reference. Another non-limiting example includes burning a material such as potassium or sodium in the presence of oxygen and a solid carrier such as silica gel or molecular sieve to form potassium superoxide or sodium superoxide, respectively on the silica gel or molecular sieve. The solid carrier that includes one more solid reactants can be kept in air-tight and water-tight packages until assembled into an electronic device such as a hard disk drive.

In some embodiments, the one or more solid reactants (e.g., granules, pellets, and the like) can be contained in one or more containers, where the one or more containers are disposed within an interior space of an electronic device such as a hard disk drive. At least a portion (e.g., substantially all) of container can include a membrane that is permeable to the gaseous oxidizing agent component (e.g., oxygen) to allow gaseous oxidizing agent component that is generated inside the container to transfer from inside the container to the interior gas space of the electronic device so that the gaseous oxidizing agent component is available for the beneficial reaction between gaseous oxidizing agent component and carbon-containing materials on internal drive components, as described herein above. Depending on the one or more solid reactants selected, the membrane can be selected to be permeable to at least one of water vapor and carbon dioxide gas to allow water vapor and/or carbon dioxide gas that is present in the interior space of the electronic device to transfer from the interior gas space of the electronic device to inside the container so that the water vapor and/or carbon dioxide gas is available to react with the one or more solid reactants container in the container and form gaseous oxidizing agent component.

A membrane can be selected to control the rate of diffusion of gaseous oxidizing agent component to the interior space of the electronic device where it can oxidize inorganic and organic materials of transducer structures as desired. A membrane can also be selected to control the rate of diffusion of carbon dioxide gas and/or water vapor from the interior space of the electronic device to inside the container.

A non-limiting example of a membrane that is permeable to gaseous oxidizing agent component and that is useful in the present disclosure includes oxygen permeable membrane. Oxygen permeable materials for use with or as a container according to the present disclosure include polymers, plastics, rubbers, elastomers, organic coatings, thin glass, and thin ceramics. In some embodiments, such materials have oxygen permeability coefficients between 0.0001 and 1000 $(mL\ mm)/(m^2\ d\ atm)$, e.g., oxygen permeability coefficients between 0.01 and 100 $(mL\ mm)/(m^2\ d\ atm)$. In some detail, illustrative permeable polymers include low density polyethylene (LDPE), high density polyethylene (HDPE), polypropylene (PP), polyvinylidene fluoride (PVDF), polyvinyl alcohol, ethylene vinyl alcohol, nylon, polycarbonate, polyimide, and combinations thereof. Oxygen permeable membranes include single or multilayer films. In some embodiments, an oxygen permeable membrane can have a thickness from greater than 0 to 500 mils, from 1 to 100 mils, or even from rom 2 to 30 mils. In some embodiments, oxygen permeable materials have permeation coefficients that increase with temperature. In some embodiments, a portion of the container can be made of an oxygen impermeable material and portion of the container is made of oxygen permeable material. For example, a portion of the container can be made of an oxygen impermeable material such as metal or glass and sealed by a lid made of an oxygen permeable membrane that is fastened to the container in any desirable manner (e.g. via glue).

In some embodiments, an entire container is made of an oxygen permeable membrane. For example, such a container can be a pouch that is sealed after the one or more solid reactants that can generate a gaseous oxidizing agent component are placed in the pouch or the container can be a vial with a threaded lid that is fastened to the container.

Selecting a container can also depend on how it is incorporated into an electronic device (e.g., HDD) to release gaseous oxidizing agent into the interior space of the electronic device. For example, whether the container is configured to passively and/or actively allow gaseous oxidizing agent component to be controllably transferred from inside the container to the interior gas space of the housing.

A container may have any desired shape including a sphere, cylinder, cone, prism, cube, pyramid or rectangular prism, and combination thereof. Furthermore, the container could be a single container or multiple separate containers.

In some embodiments, a container is disposed within an environmental control module and/or outside an environmental control module. In other embodiments, the container is an environmental control module.

A non-limiting embodiment of an electronic device that includes a container having a solid carrier with one or more solid reactants that react with one or more of water vapor and carbon dioxide gas to form a gaseous oxidizing agent component is described herein below with respect to FIGS. 1-3.

FIG. 1 illustrates an exploded perspective view of a hard disk drive (HDD) 12 as an electronic device according to the present disclosure. As shown, HDD 12 includes a housing 19 having base 20 and at least one top cover plate 30 (e.g., a process cover). In some embodiments, top cover plate 30 can be a final cover plate mounted over a process cover plate. As shown in FIG. 2, base 20 is a box-shaped housing component.

Base 20 can accommodate one or more electronic components disposed within the housing. As shown, base 20 accommodates a plurality of magnetic disks 21 as recording media for recording information data, and magnetic heads 22 opposed to the disk surfaces of the respective recording disks 21 for reading and writing information. The recording disks 21 may rotate about a rotation axis 24 fixed to the base 20. The rotation of the disks 21 can be driven by a spindle motor, not shown. An actuator arm 25 of an actuator arm assembly, with the magnetic head 22 at the tip end, may swing about an actuator arm axis 27 fixed to the base 20. As shown, the swinging movement of the actuator arm 25 is caused by a magnetic circuit 26 that includes an actuator. The magnetic heads 22 are positioned to a target recording track and block through the rotation of the disks 21 and the swinging movement of the actuator arm 25.

Top cover plate 30 can close a housing opening 29 of the base 20, thereby defining a housing gas interior gas space 40. The top cover plate 30 can be fastened to the base 20 by a variety of fasteners. As shown, top cover plate 30 can be coupled to the base 20 using screws 31 positioned at four corners of the top cover plate 30 so as to form the housing 19. As shown, screw receiving recesses 32 are formed at the corners of the top cover plate 30 so as to prevent the heads of the screws 31 from protruding from the level of the surface of the top cover plate 30. Steps 34 can be formed on the base 20 inside a housing edge 33 at the corners for receiving the screw receiving recesses 32 of the top cover plate 30. When the steps 34 receive the screw receiving recesses 32, the surface of the top cover plate 30 is leveled with the housing edge 33. Moreover, the heads of the screws 31 are prevented from protruding from the surface of the top cover plate 30.

When the top cover plate 30 is coupled to the base 20, two connecting screws 35 can be screwed into the tip ends of the rotation axis 24 and the axis 27. As shown, connecting screw receiving recesses 36 are formed in the top cover plate 30 so as to prevent the heads of the connecting screws 35 from protruding from the level of the surface of the top cover plate 30.

The top cover plate 30 may be formed by a press from a metal plate such as aluminum. The press can shape the screw receiving recesses 32 and the connecting screw receiving recesses 36 on the top cover plate 30.

Figure 2A:
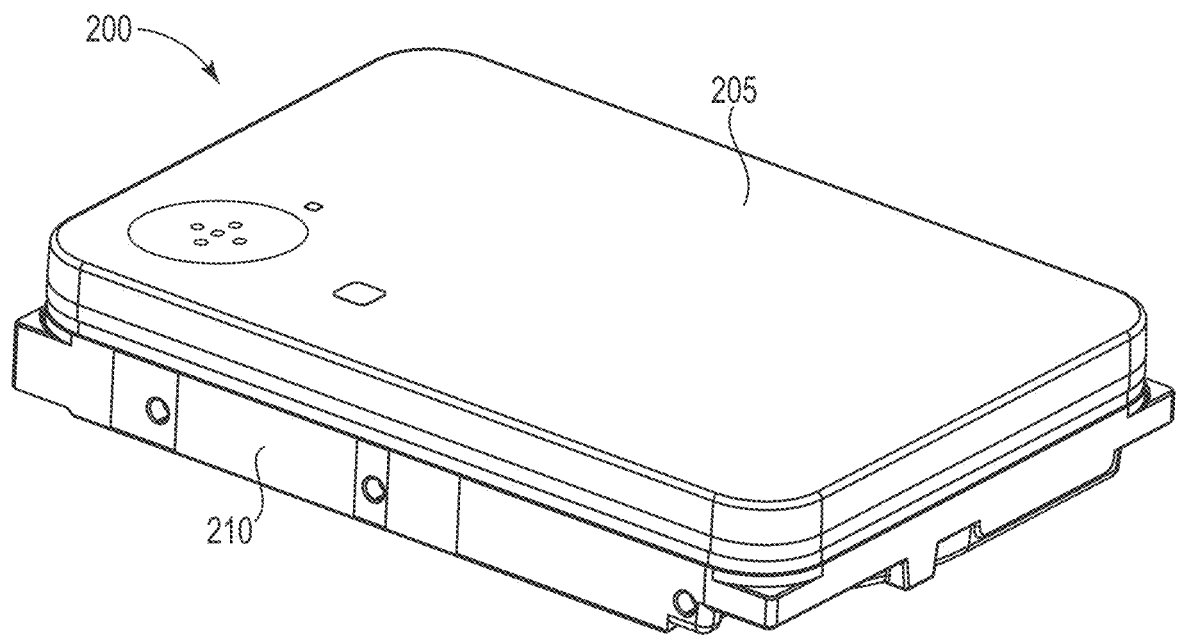
FIG. 2A is a perspective view of a hard disk drive that includes a final hard disk drive cover positioned on a hard disk drive base.
Figure 2B:
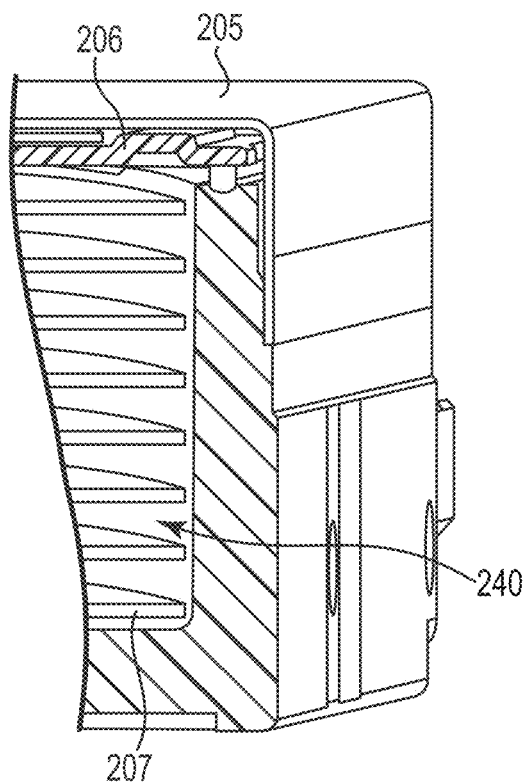
FIG. 2B is a partial cross-section view of the hard disk drive shown in FIG. 2A.

FIGS. 2A and 2B show a hard disk drive 200 similar to hard disk drive 12 shown in FIG. 1, except hard disk drive 200 shows both a final cover 205 and a process cover 206. As shown, final cover 205 is in position over process cover 206 and on base 210, thereby defining an interior gas space 240. As shown, final cover 205 is a metallic substrate such as aluminum that has been formed (e.g., stamped) into the shape of final cover 205. Also, base 210 is a metallic substrate such as cast or wrought aluminum.

Figure 3:
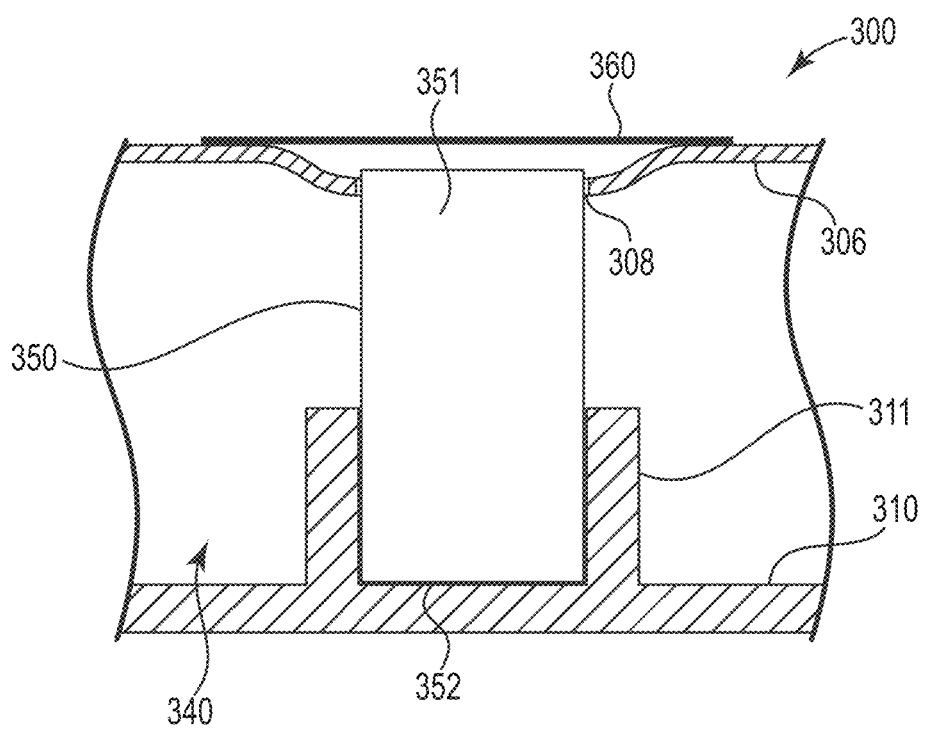
FIG. 3 shows a partial, cross-section schematic illustrating one non-limiting embodiment according to the present disclosure of a container that has been inserted through an aperture in hard disk drive housing and into the interior gas space of the housing, where the container contains one or more solid reactants that react with one or more of water vapor or carbon dioxide gas to form the gaseous oxidizing agent component.

FIG. 3 illustrates one non-limiting embodiment according to the present disclosure of a container positioned in the interior gas space of a hard disk drive housing, where the container contains one or more solid reactants that react with one or more of water vapor or carbon dioxide gas to form the gaseous oxidizing agent component.

As shown in FIG. 3, hard disk drive 300 includes a base 310 having a process cover 306 fastened to base 310, thereby defining a hard disk drive housing interior gas space 340. A container 350 is positioned inside the hard disk drive 300. The container 350 includes a membrane 352 that is permeable to gaseous oxidizing agent component (e.g., oxygen) to allow gaseous oxidizing agent component to transfer from inside the container 350 to the interior gas space 340. Membrane 352 is also permeable to water vapor and carbon dioxide gas to allow water vapor and carbon dioxide gas to transfer from interior gas space 340 to inside container 350. Container 350 contains solid carrier 351 that includes one or more solid reactants. The one or more solid reactants react with one or more of water vapor or carbon dioxide gas to form the gaseous oxidizing agent component as described herein above.

During assembly of the hard disk drive 300, container 350 can be inserted through aperture 308 and into the interior gas space 340 until container is positioned in slot 311 of base 310. After container 350 is positioned in slot 311, a hermetic seal can be formed over container 350 and aperture 308, which can remain in place during the service life of hard disk drive 300.

The container 350 can be located in any desired place within hard disk drive 300. For example, container 350 can be positioned near the recirculation filter to take advantage of the higher airflow speed to facilitate material exchanges and the oxygen generation process. As another example, container 350 can be positioned in one or more other locations, e.g., near the PCC power connector.

During the service life of hard disk drive 300, hard disk drive can perform read/write operations while water vapor and/or carbon dioxide gas are passively generated as described herein above and can transfer through membrane 352 and react with the one or more solid reactants in container 350 to form gaseous oxidizing agent component that can transfer through membrane 352 into the interior gas space 340. The gaseous oxidizing agent component is then available for beneficial reaction with carbon-containing materials on internal drive components (e.g., HAMR NFT).

Figure 4:
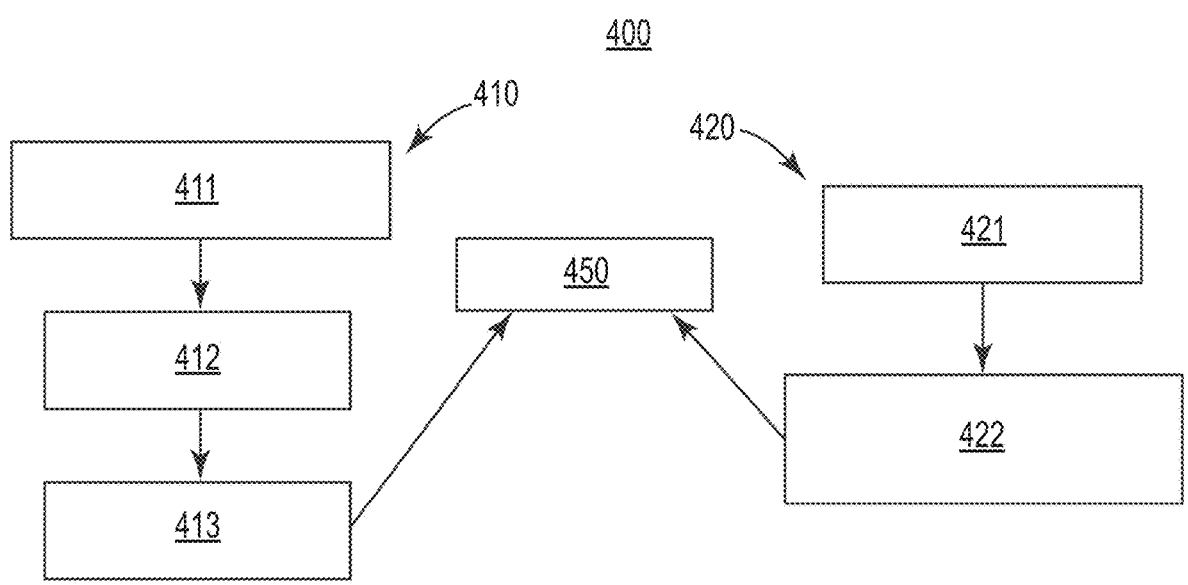
FIG. 4 is a process flow diagram illustrating an example of a self-sustaining process according to the present disclosure for generating gaseous oxidizing agent component such as oxygen within hard disk drive 300 of FIG. 3.

An example illustrating a self-sustaining process 400 for generating gaseous oxidizing agent component such as oxygen within hard disk drive 300 is illustrated with respect to FIG. 4. Process 400 includes two illustrative pathways 410 and 420 for generating oxygen 450 within container 350 that can transfer through membrane 352 and into interior gas space 340 for the beneficial reaction between oxygen and carbon-containing materials on internal drive components.

In pathway 410, during operation 411 of hard disk drive 300, carbon-containing materials are created on an internal drive component such as HAMR NFT. Oxygen that is present in interior gas space 340 can react 412 with the carbon-containing materials to produce carbon dioxide gas that transfers from interior gas space 340 into container 350 through membrane 352. The carbon dioxide gas can react 413 with solid reactant (e.g., potassium superoxide and/or sodium superoxide) on carrier 351 to produce oxygen 450 that transfers through membrane 352 and into interior gas space 340.

In pathway 420, after hard disk drive 300 is assembled water vapor can be present 421 in interior gas space 340 due to "built-in" moisture while assembling the hard disk drive 300 and/or one or more internal hard disk drive components releasing moisture over time. The water transfers 422 from interior gas space 340 into container 350 through membrane 352. The water vapor can react with solid reactant (e.g., potassium superoxide and/or sodium superoxide) on carrier 351 to produce oxygen 450 that transfers through membrane 352 and into interior gas space 340.

What is claimed is:

1. An electronic device comprising:
   a) a housing having an interior gas space;
   b) one or more electronic components disposed within the housing;
   c) one or more solid reactants that react with one or more of water vapor and carbon dioxide gas to form a gaseous oxidizing agent component; and
   d) a solid carrier comprising the one or more solid reactants, wherein the solid carrier has an exterior surface and a plurality of pores that form interior surfaces, wherein the one or more solid reactants are present on the exterior and interior surfaces of the solid carrier, and wherein the solid carrier is different from the one or more solid reactants.

2. The electronic device of claim 1, wherein the one or more solid reactants are chosen from peroxides, superoxides, percarbonates, perborates, permanganates, persulfates, peroxyhydrate salts, and mixtures thereof.

3. The electronic device of claim 1, wherein the one or more reactants are chosen from calcium peroxide, magnesium peroxide, barium peroxide, zinc peroxide, cadmium peroxide, strontium peroxide, lithium peroxide, sodium peroxide, potassium peroxide, lithium nickel peroxide, potassium superoxide, sodium superoxide, sodium percarbonate, potassium percarbonate, calcium percarbonate, magnesium percarbonate, sodium perborate, sodium perborate tetrahydrate, potassium perborate, calcium perborate, magnesium perborate, potassium permanganate, sodium persulfate, potassium persulfate, potassium pyrophosphate peroxyhydrate, sodium sulfate-hydrogen peroxide-sodium chloride adduct, sodium chlorate and mixtures thereof.

4. The electronic device of claim 1, wherein the one or more reactants are chosen from potassium superoxide, sodium superoxide, and mixtures thereof.

5. The electronic device of claim 1, wherein the solid carrier is chosen from silica gel, molecular sieves, and combinations thereof.

6. The electronic device of claim 1, wherein the one or more solid reactants that react with at least water vapor and carbon dioxide gas to form a gaseous oxidizing agent component.

7. The electronic device of claim 6, wherein the one or more solid reactants are chosen from sodium peroxide, potassium peroxide, and mixtures thereof.

8. The electronic device of claim 7, wherein the plurality of pores have a pore diameter in the range from 0.1 to 50 nanometers.

9. The electronic device of claim 6, further comprising a container disposed within the electronic device, wherein the container contains the one or more solid reactants, wherein the container comprises a membrane that is permeable to the gaseous oxidizing agent component to allow gaseous oxidizing agent component to transfer from inside the container to the interior gas space, and wherein the membrane is permeable to both water vapor and carbon dioxide gas to allow both water vapor and carbon dioxide gas to transfer from the interior gas space to inside the container.

10. The electronic device of claim 1, wherein the one or more solid reactants react with one or more of water vapor and carbon dioxide gas to also form one or more byproducts that react or decompose to form one or more of water vapor, carbon dioxide gas and a gaseous oxidizing agent component.

11. The electronic device of claim 1, wherein the one or more solid reactants react with one or more of water vapor and carbon dioxide gas to also form one or more byproducts that are alkaline hygroscopic compounds or that react or decompose to form alkaline hygroscopic compounds.

12. The electronic device of claim 1, further comprising a catalyst chosen from one or more of potassium iodide, manganese oxides, manganese compounds, copper oxides, silver, potassium dichromate, vanadium oxides, vanadium compounds, iron oxides, and mixtures thereof.

13. The electronic device of claim 1, wherein the interior gas space nominal relative humidity of 20% or less at 25° C., and wherein the interior gas space comprises helium gas and the device has a helium leak rate of $50 \times 10^{-8}$ atm (atmosphere) cc (cubic centimeter)/second or less at 25° C.

14. The electronic device of claim 1, wherein the interior gas space comprises helium gas, wherein the helium gas is present in the interior gas space at a mole fraction of at least 80 percent based on the total gas in the interior gas space.

15. The electronic device of claim 1, wherein the gaseous oxidizing agent component can be generated to provide the gaseous oxidizing agent component in the interior gas space at a mole fraction in the range from 0.1 to less than 20 mole percent based on the total gas in the interior gas space.

16. The electronic device of claim 1, wherein the one or more solid reactants are present in an amount to generate the gaseous oxidizing agent component over a time period of at least five years.

17. The electronic device of claim 1, further comprising a container disposed within the electronic device, wherein the container contains the one or more solid reactants, wherein the container comprises a membrane that is permeable to the gaseous oxidizing agent component to allow gaseous oxidizing agent component to transfer from inside the container to the interior gas space.

18. The electronic device of claim 17, wherein the membrane is permeable to at least one of water vapor and carbon dioxide gas to allow at least one of water vapor and carbon dioxide gas to transfer from the interior gas space to inside the container.

19. The electronic device of claim 17, wherein the membrane is permeable to both water vapor and carbon dioxide gas to allow both water vapor and carbon dioxide gas to transfer from the interior gas space to inside the container.

20. A method of making an electronic device, the method comprising:
 a) assembling an electronic device comprising:
  i) a housing comprising:
   A) a base;
   B) a process cover attached to the base; and
   C) an interior gas space; and
  ii) one or more electronic components disposed within the housing; and
 b) inserting a container through an aperture in the housing and into the interior gas space of the housing, wherein the aperture is present in the process cover, wherein the container comprises a membrane that is permeable to gaseous oxidizing agent component to allow gaseous oxidizing agent component to transfer from inside the container to the interior gas space, and wherein the container contains one or more solid reactants that react with one or more of water vapor or carbon dioxide gas to form the gaseous oxidizing agent component; and
 c) hermetically sealing the aperture.

21. The method of claim 20, further comprising, after hermetically sealing the aperture, attaching a final cover over the process cover and to the housing.

* * * * *